(12) United States Patent
Sitti et al.

(10) Patent No.: US 9,079,215 B2
(45) Date of Patent: Jul. 14, 2015

(54) MICRO-FIBER ARRAYS WITH TIP COATING AND TRANSFER METHOD FOR PREPARING SAME

(71) Applicant: Carnegie Mellon University, Center for Technology Transfer and Enterprise Creation, Pittsburgh, PA (US)

(72) Inventors: Metin Sitti, Pittsburgh, PA (US); Newell Raymond Washburn, Pittsburgh, PA (US); Paul Samuel Glass, Pittsburgh, PA (US); Hoyong Chung, Pasadena, CA (US)

(73) Assignee: Carnegie Mellon University, Pittsburgh, PA (US)

( * ) Notice: Subject to any disclaimer, the term of this patent is extended or adjusted under 35 U.S.C. 154(b) by 2 days.

(21) Appl. No.: 13/772,811

(22) Filed: Feb. 21, 2013

(65) Prior Publication Data
US 2013/0183481 A1 Jul. 18, 2013

Related U.S. Application Data

(63) Continuation-in-part of application No. PCT/US2011/001474, filed on Aug. 23, 2011.

(60) Provisional application No. 61/402,036, filed on Aug. 23, 2010.

(51) Int. Cl.
*B05D 5/10* (2006.01)
*B05D 3/02* (2006.01)
*B05D 3/06* (2006.01)
*C09J 133/26* (2006.01)
*C08F 222/10* (2006.01)

(52) U.S. Cl.
CPC .............. *B05D 5/10* (2013.01); *B05D 3/0254* (2013.01); *B05D 3/06* (2013.01); *C09J 133/26* (2013.01); *C08F 222/1006* (2013.01)

(58) Field of Classification Search
CPC ........ B05D 3/0254; B05D 3/061; B05D 5/10; C08J 7/12
See application file for complete search history.

(56) References Cited

U.S. PATENT DOCUMENTS

| 6,663,820 B2 | 12/2003 | Arias et al. |
| 7,531,120 B2 | 5/2009 | Van Rijn et al. |
| 2008/0169059 A1 | 7/2008 | Messersmith et al. |

FOREIGN PATENT DOCUMENTS

WO 03/008646 A2 1/2003

OTHER PUBLICATIONS

International Search Report and Written Opinion of the International Searching Authority for PCT Application No. PCT/US2011/001474 dated May 1, 2012.
Glass, Paul et al. "Enhanced Reversible Adhesion of Dopamine Methacrylamide-Coated Elastomer Microfibrillar Structures under Wet Conditions." Langmuir 2009, 25(12), 6607-6612.

*Primary Examiner* — Elena T Lightfoot
(74) *Attorney, Agent, or Firm* — David G. Oberdick

(57) ABSTRACT

Present invention describes a patterned and coated micro- and nano-scale fibers elastomeric material for enhanced adhesion in wet or dry environments. A multi-step fabrication process including optical lithography, micromolding, polymer synthesis, dipping, stamping, and photopolymerization is described to produce uniform arrays of micron-scale fibers with mushroom-shaped tips coated with a thin layer of an intrinsically adhesive synthetic polymer, such as lightly crosslinked p(DMA-co-MEA).

21 Claims, 9 Drawing Sheets

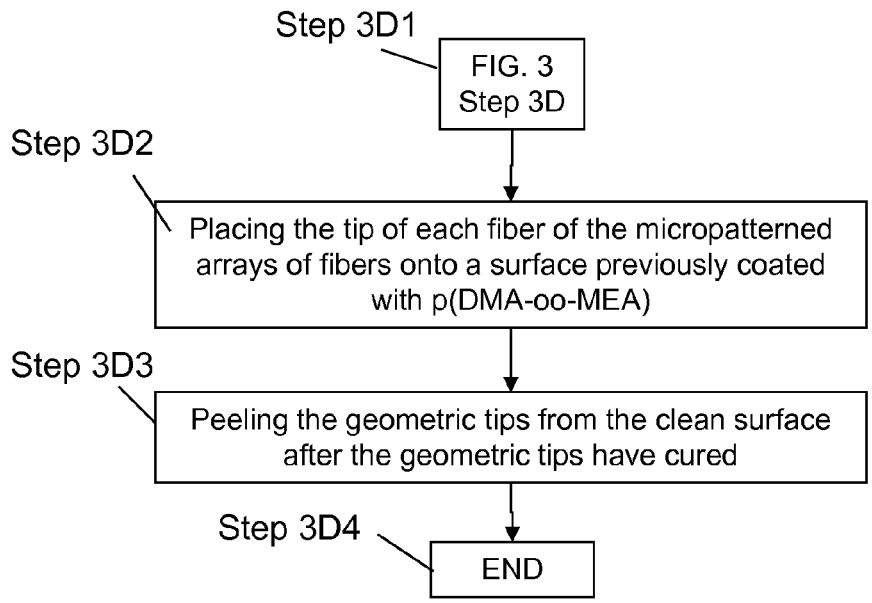
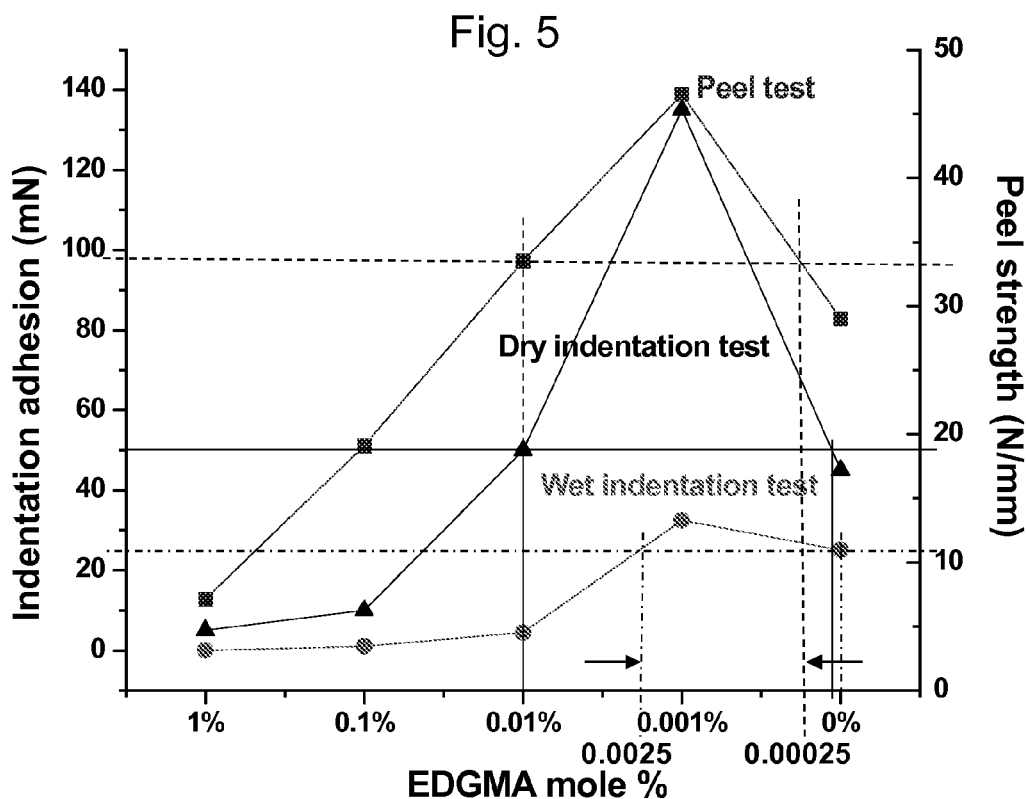

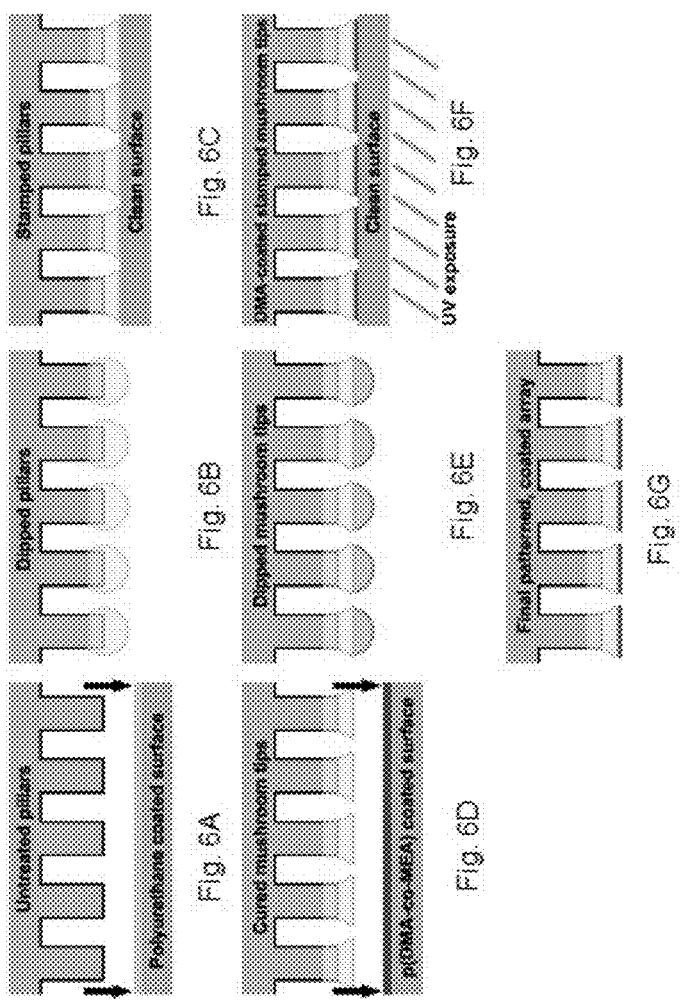

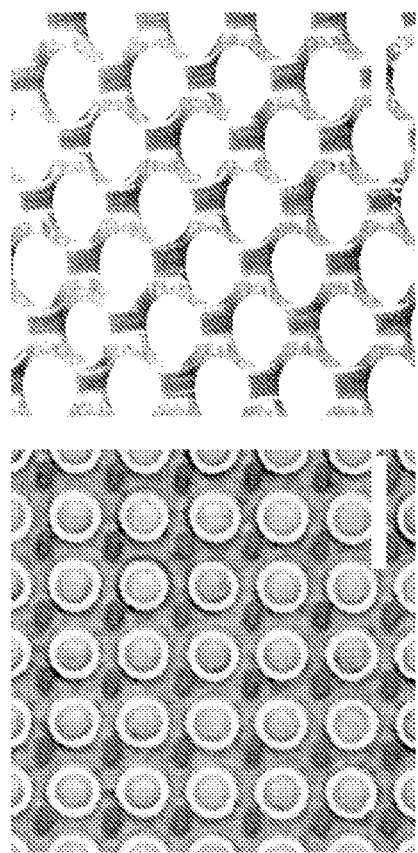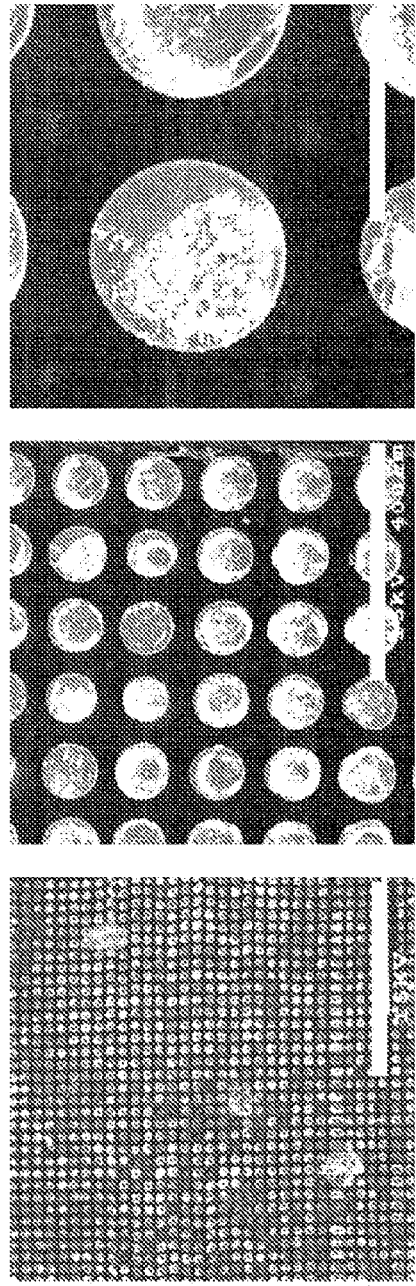
Fig. 7A
Fig. 7B
Fig. 7C
Fig. 7D
Fig. 7E

MICRO-FIBER ARRAYS WITH TIP COATING AND TRANSFER METHOD FOR PREPARING SAME

CROSS-REFERENCE TO RELATED APPLICATIONS

This application is a Continuation In Part Application of Patent Cooperation Treaty International Application Number PCT/US2011/001474, titled MICRO-FIBER ARRAYS WITH TIP COATING AND TRANSFER METHOD FOR PREPARING SAME, filed on Aug. 23, 2011, which claims priority from U.S. Provisional Application No. 61/402,036, titled ENHANCED ADHESION OF MICRO-FIBER ARRAYS WITH TIP COATING, filed Aug. 23, 2010, which are both incorporated herein by reference.

STATEMENT REGARDING FEDERALLY-SPONSORED RESEARCH AND DEVELOPMENT

This invention was made with partial government support by the National Science Foundation (CMMI-0800408). The government has certain rights in this invention.

FIELD OF THE INVENTION

The present invention is related generally to the process to manufacture patterned and coated elastomeric micro-fibrillar material for enhanced repeatable adhesion.

BACKGROUND OF THE INVENTION

Developing materials capable of demonstrating robust, repeatable adhesion to dry or wet substrates is a major challenge that may solve problems in applications ranging from medical device implementation to mobile robotics. A repeatable adhesive is a material that can stick and unstick to a surface without either damaging the surface or the adhesive material itself. Conventional adhesives, like glue, that cannot be unstuck from a substrate without damage to the substrate or significant performance deterioration, or pressure sensitive adhesives, like scotch tape, that deteriorate and lose their stickiness with repeated use.

SUMMARY OF THE INVENTION

The present invention uses a multi-step fabrication process including optical lithography, micromolding, polymer synthesis, dipping, stamping, and photopolymerization to produce uniform arrays of micron-scale fibers coated with a thin layer of lightly crosslinked p(DMA-co-MEA), an intrinsically adhesive synthetic polymer. The present invention has demonstrated hundreds of test cycles of sticking and unsticking to a substrate without damaging the substrate or significant performance deterioration.

BRIEF DESCRIPTION OF THE DRAWINGS

For the present invention to be easily understood and readily practiced, the invention will now be described, for the purposes of illustration and not limitation, in conjunction with the following figures, wherein:

FIG. 5 is a process flow diagram of one embodiment of the present invention.

FIGS. 6A-G are process diagrams for one embodiment for material fabrication according to the present invention;

FIGS. 7A-E are microscopy images of fabricated patterned, p(DMA-co-MEA)-coated arrays of fibers with mushroom tips;

FIG. 10 is a data plot of the effects of crosslinker EDGMA by mole % on Indentation Adhesion (mN) and Peel Strength (N/mm).

DETAILED DESCRIPTION OF THE INVENTION

The present invention describes a process for coating the tips of micro-scale fibers, such as polyurethane micro-fibers, with a polymer to enhance adhesion in dry and wet conditions. In one embodiment, the polyurethane fibers have mushroom shaped tips, but other embodiments could use other geometries, including cylindrical fibers, fibers with spatula-shaped tips, film-terminated fiber arrays, angled fibers, fibers with angled tips, porous or cleaved geometries which demonstrate crack-trapping for enhanced adhesion, or any other geometry which demonstrates crack trapping to enhance adhesion. Significant adhesion force and adhesion hysteresis enhancements result when the fiber tips are coated according to the present invention compared to previously-evaluated fiber arrays. The fabrication process presented in the present invention may also be generalized for a variety of different tip coating materials, allowing for the development of repeatable, reversible adhesives to specifically targeted substrates in different environmental conditions. The terms "coated" and "stamped" have the same meaning and are interchangeable herein.

In one embodiment of the present invention, poly(dopamine methacrylate-co-2-methoxyetheyl acrylate) (p(DMA-co-MEA) is used as the tip coating material. This material is well characterized and contains the DOPA-containing monomer dopamine methacrylate (DMA). DMA not only has the adhesive functionality of DOPA, it also contains a vinyl group, which makes it easy to polymerize with other vinyl monomers via radical polymerization. In this embodiment, micro-patterned arrays of fibers with mushroom tips are coated with lightly crosslinked p(DMA-co-MEA), which is fabricated by first preparing an optimized p(DMA-co-MEA) precursor solution, and then by carefully designing and implementing a multi-step dipping and stamping process to transfer a sufficient p(DMA-co-MEA) precursor solution volume onto the tips of micro-molded polyurethane fibers, at which point the tip coating material are polymerized.

Figure 1:
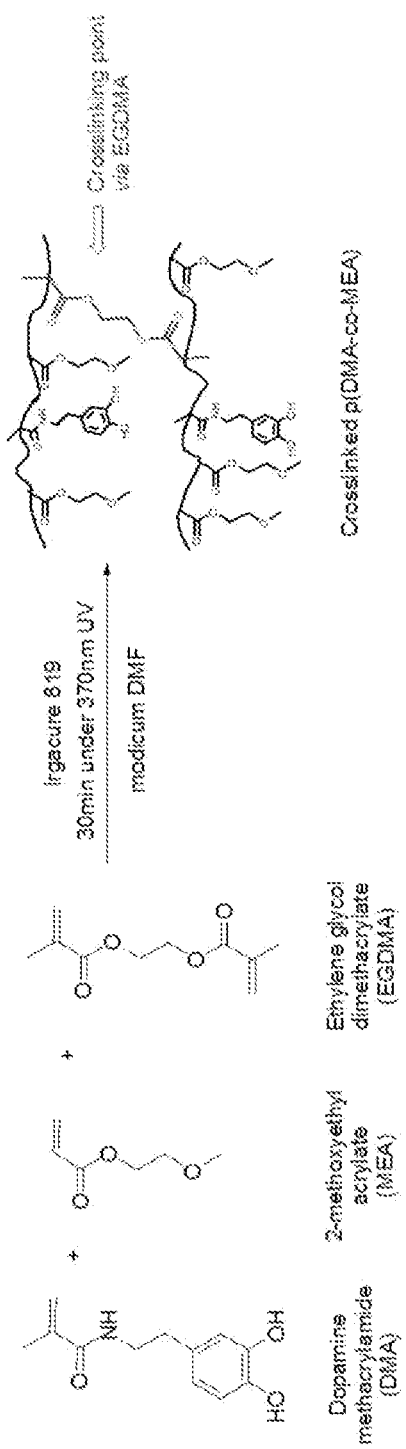
FIG. 1 is an illustration of the synthesis of lightly crosslinked poly (dopamine methacrylate-co-2-methoxy-etheyl acrylate) (p(DMA-co-MEA)) using ethyleneglycol dimethacrylate (EDGMA) as a crosslinking agent.

Preparation of Precursor Solution—In one embodiment of the present invention, DMA is first synthesized and characterized. One embodiment of an optimized photopolymerizable p(DMA-co-MEA) solution is prepared by mixing 1 part of DMA with 7.2 parts of MEA (by mole ratio), 0.017 parts photoinitiator (Irgacure 819, Ciba Specialty Chemicals), 0.00001 part of crosslinker (ethyleneglycol dimethacrylate (EDGMA), Aldrich Chemical Company), and 1.2 parts in weight of dimethylformamide (DMF) (DMF, Aldrich Chemical Company), which is illustrated in FIG. 1. In testing of bulk p(DMA-co-MEA) material samples with various crosslinker concentrations, samples with 0.001% EDGMA molarity (or 0.00001 part of optimized photopolymerizable p(DMA-co-MEA) solution) were determined to have optimum adhesion performance in both wet and dry glass hemisphere indentation testing. FIG. 10 is a data plot of the effects of crosslinker EDGMA by mole % on Wet and Dry Indentation Adhesion (mN) and Peel Strength (N/mm) that indicates that the optimal range for crosslinker EDGMA by mole % is about 0.00025% (or 0.0000025 part of optimized photopolymerizable p(DMA-co-MEA) solution) to about 0.0025% (or 0.000025 part of optimized photopolymerizable p(DMA-co-MEA) solution). This enhanced adhesion is partially attributed to a balance between the viscous liquid-like qualities of the polymer and its elastic solid-like properties arising from changes in the crosslinking concentration.

In one embodiment of the present invention, photopolymerization is used to prepare these bulk adhesives, which allows for reactions to be completed in 30 minutes, a relatively short time. In particular, using the divinyl crosslinking agent ethyleneglycol dimethacrylate (EGDMA) as a tool for controlling the degree of crosslinking was an effective approach due to its ease and reproducibility. The biggest difference between EDGMA and a metal-based crosslinker is the crosslinking point of the polymer chains. As shown in FIG. 1, individual polymer chains are connected through the covalent bond provided from the divinyl group-containing EGDMA. These covalent bonds are robust and maintain the material bulk properties until the bond is broken by extreme external heat or force. Therefore, crosslinked polymers which contain EGDMA may offer more stable physical and chemical properties than a polymer crosslinked by a metal-based coordination bond.

Other embodiments may involve others polymers known to those skilled in the art that can be synthesized using a radical initiator. In still other embodiments, the coating material would be polysaccharide mucoadhesives.

Those skilled in the art will recognize that other variations of coating materials could be used in the present invention. In one embodiment, magnetic micro and/or nano particles would be embedded in the coating material for enhanced adhesion to magnetic substrates. In another embodiment, the same fabrication process would be used to coat fiber tips with mucoadhesive materials for targeted binding with specific proteins in the digestive tract, which can have applications for medical devices for endoscopic interventions in the intestine. Other materials which demonstrate targeted binding with cellular proteins during physiological processes could be used in the present invention for applications such as tissue adhesives. In another embodiment of the invention, the same fabrication process would be used to coat fiber tips with a softer elastomer with Shore A hardness ranging from about Shore A 1 to about Shore A 90 to increase the adhesion of the product with hard substrates.

Figure 2:
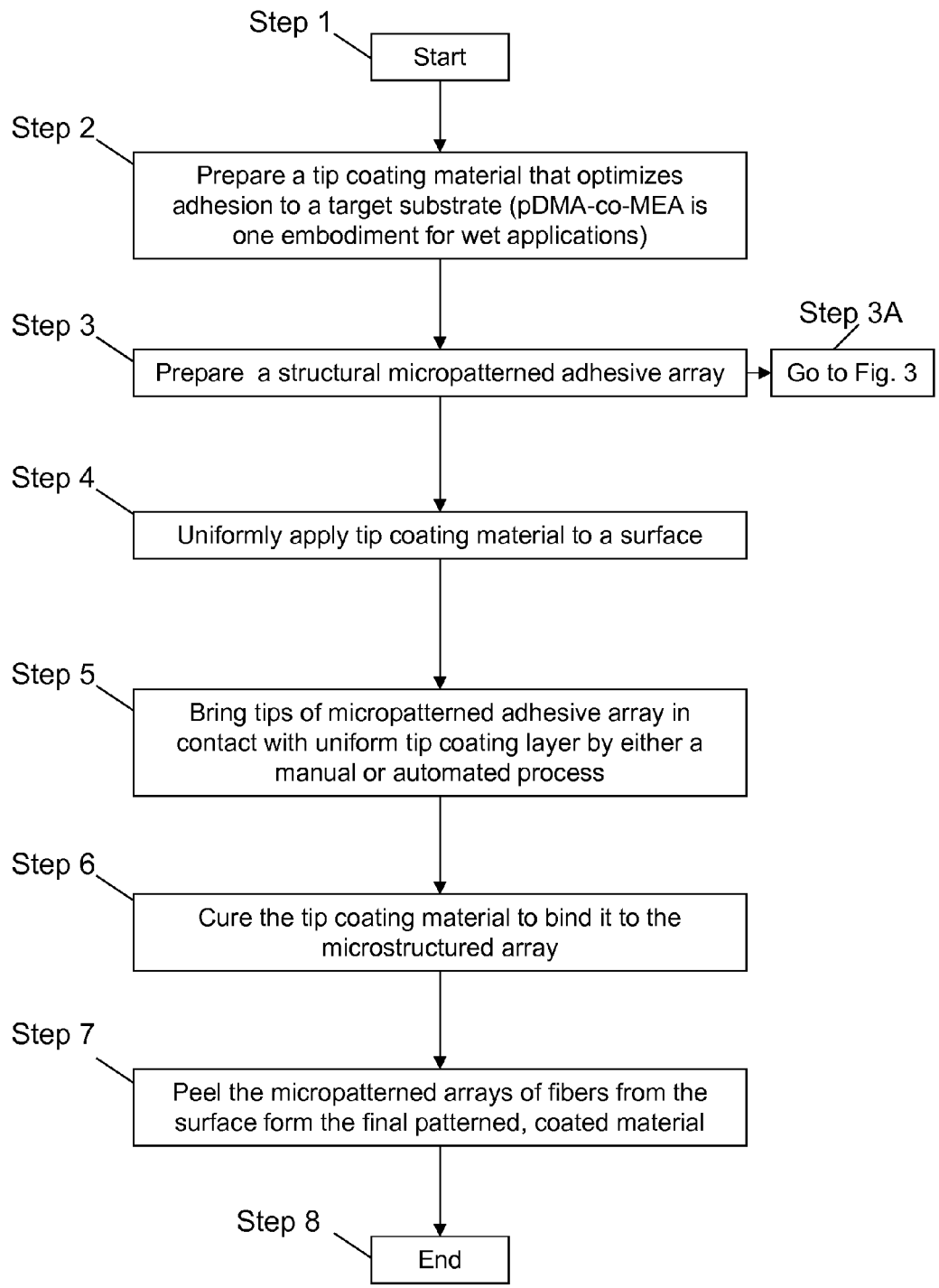
FIG. 2 is a process flow diagram of one embodiment of the present invention.

FIG. 2 is a process flow diagram of one embodiment of the present invention. Step 1 starts the process leading into Step 2 for the preparation of a tip coating material that optimizes adhesion to a target substrate. One target substrate use for wet applications is pDMA-co-MEA. Step 3 of the process is the preparation of a structural micopatterned adhesive array, which is further explained below and in FIG. 3. Step 4 of the process is the uniform application of tip coating material to an uncoated surface by spin-coating or knife-coating or deposition spraying by either a manual or automated process to form a coated surface. Other methods of transferring uniformly a volume of the tip coating material onto the surface can be selected from the group consisting of coating processes include: gravure coating, reverse roll coating, slot die (extrusion) coating, immersion (dip) coating, curtain coating, and air knife coating. Step 5 of the process is bring the tips of the micropatterned adhesive array in contact with uniform tip coating layer by either a manual or automated process. Step 6 of the process is to cure the tip coating material to bind it to the microstructured array. This can be done by: 1. Exposing the micropatterned arrays of fibers with ultraviolet (UV) light to initiate polymerization of the tip coating UV light parameters: wavelength of 100 nm-400 nm; exposure time of 0.01 s to 10 hrs, or 2. Using a thermoset tip coating material which would be exposed to heat instead of UV light, Heat parameters: 25 C-250 C; heating times of 0.01 minute to 48 hrs, or 3. Allowing any possible tip coating material solvent to evaporate. Step 7 of the process of peeling the micropatterned arrays of fibers from the surface form the final patterned, coated material to end the process (Step 8).

Figure 3:
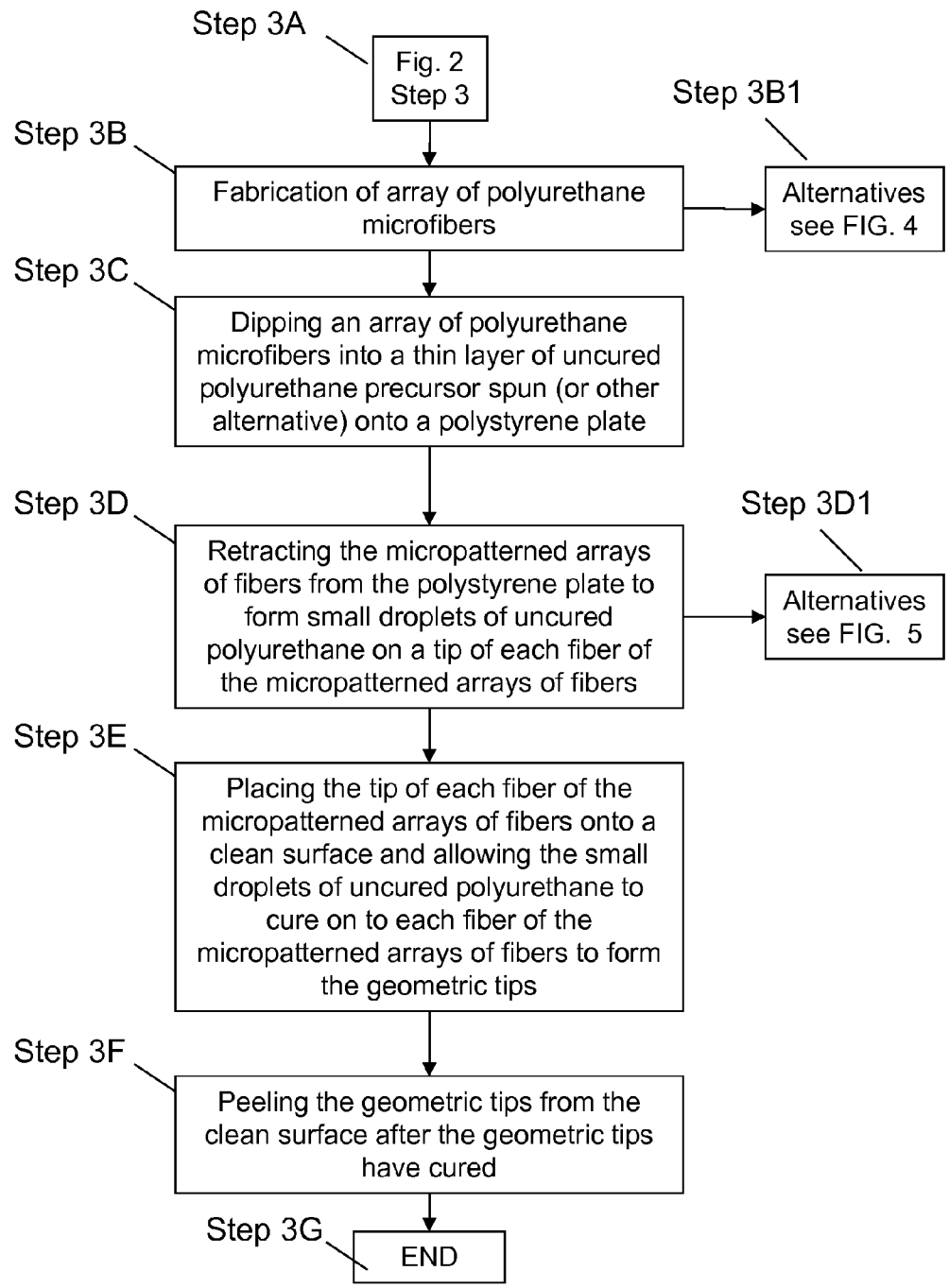
FIG. 3 is a process flow diagram of one embodiment of the preparation of a structural micropatterned adhesive array.
Figure 4:
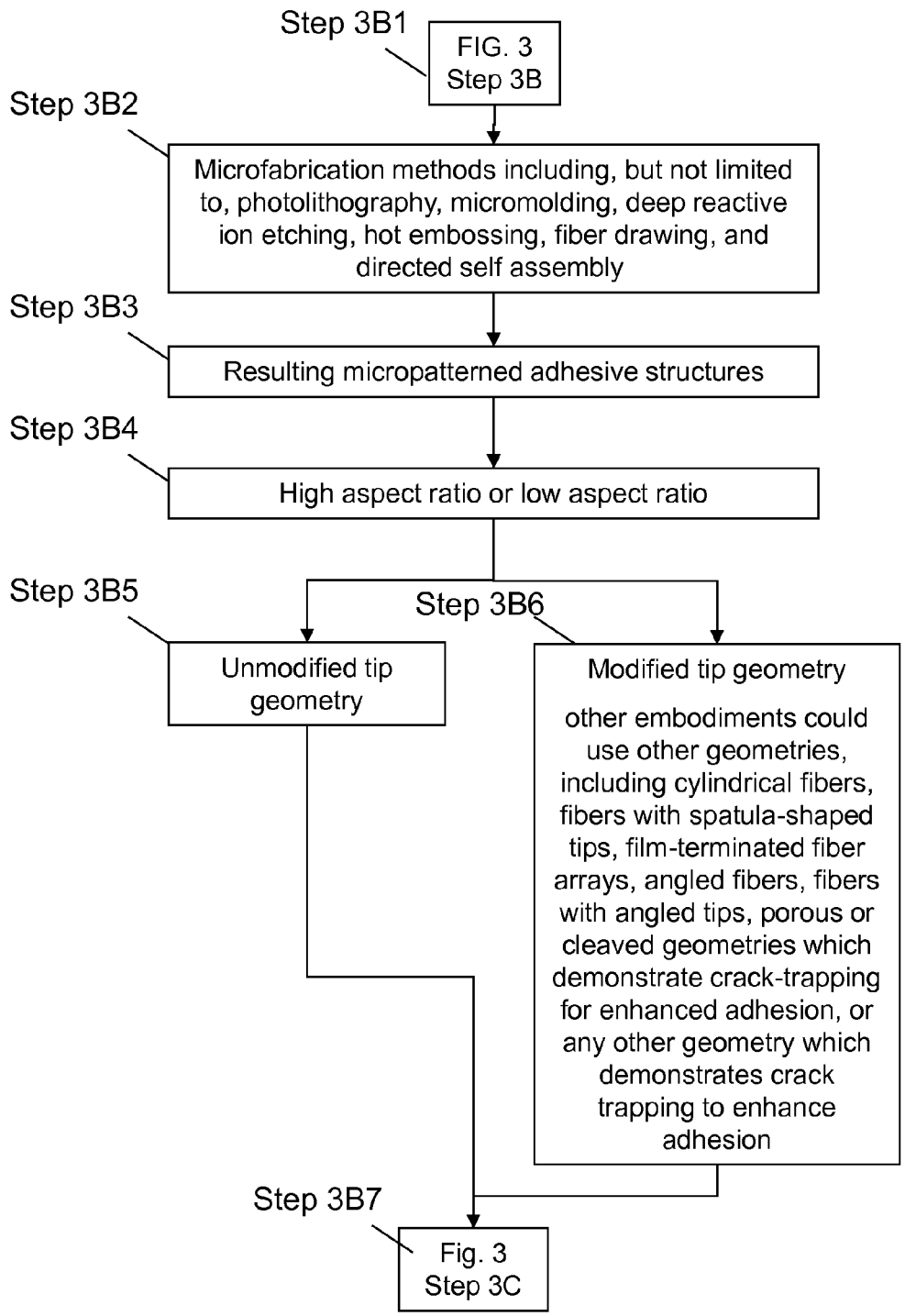
FIG. 4 is a process flow diagram of one embodiment of the step to fabrication of an array of microcylinders.

FIG. 3 is a process flow diagram of one embodiment of the preparation of a structural micropatterned adhesive array (Step 3 of the process) starting with the fabrication of array of microcylinders (Step 3B). FIG. 4, Step 3B2 provides examples of processes acceptable for the fabrication of array of microcylinders including but not limited to, photolithography, interference lithography, micromolding, deep reactive ion etching, hot embossing, fiber drawing, and directed self assembly. Completion of Step 3B2 results in the micropatterned adhesive structures of Step 3B3. Step 3B4 represents that micropatterned adhesive structures can be either high aspect ratio or low aspect ratio. The resulting micropatterned adhesive structures can have an unmodified tip geometry (Step 3B5) or a modified tip geometry (Step 3B6), and ready for the Step 3C of FIG. 3 (Step 3B7 of FIG. 4). Other embodiments could use other geometries, including cylindrical fibers, fibers with spatula-shaped tips, film-terminated fiber arrays, angled fibers, fibers with angled tips, porous or cleaved geometries which demonstrate crack-trapping for enhanced adhesion, or any other geometry which demonstrates crack trapping to enhance adhesion.

Now returning to FIG. 3, the array of cylindrical polyurethane microfibers are dipped into a thin layer of uncured polyurethane precursor spun onto a polystyrene plate (Step 3C) after the fabrication of the array of microcylinders (Step 3B). Following the dipping step, the micropatterned arrays of fibers are retracted from the plate, resulting in an array of fibers with small droplets of uncured polyurethane on the tip of each fiber (Step 3D). FIG. 5, Step 3D1, provides alternatives to the retracting step by placing the tip of each fiber of the micropatterned arrays of fibers onto a surface previously coated with p(DMA-co-MEA) (Step 3D2) and peeling the geometric tips from the clean surface after the geometric tips have cured (Step 3D3) to end the process (Step 3D4 of FIG. 5).

Now returning to FIG. 3, the tip of each fiber of the micropatterned arrays of fibers is placed onto a clean surface allowing the small droplets of uncured polyurethane to cure on to each fiber of the micropatterned arrays of fibers to form the geometric tips (Step 3E). After curing, the geometric tips are peeled from the clean surface (Step 3F) to end the process (Step 3G of FIG. 3)

FIGS. 6A-E are process diagrams for one embodiment for material fabrication according to the present invention; FIG. 6A are arrays of untreated pillars are brought into contact with a polystyrene surface coated with a thin layer of liquid polyurethane; FIG. 6B is the array retracted from a coating polystyrene surface leaving a small amount of polyurethane on each pillar or fiber tip; FIG. 6C is the array being stamped onto a clean surface and the tips are allowed to cure, resulting in a mushroom shape; FIG. 6D are the pillars with mushroom tips being brought into contact with a glass surface coated with a thin liquid layer of p(DMA-co-MEA) polymer precursor mixture; FIG. 6E is the array being retracted from the coated glass surface leaving a small amount of the p(DMA-co-MEA) precursor solution on each mushroom tip and a brief wait period allows some solvent to evaporate, for example a wait period can range from about 30 to 120 seconds for some solvents; FIG. 6F is the array being stamped onto a clean, transparent polystyrene surface and exposed to, for example, 365 nm wavelength Ultra-Violet (UV) light for twenty-five minutes to initiate photopolymerization; FIG. 6G is the patterned, coated array is peeled from the polystyrene surface, resulting in the finished material. As mentioned about, the UV light parameters are: wavelength of 100 nm-400 nm; exposure time of 0.01 s to 10 hrs.

Fabrication of Shaped Tips—In one embodiment of the present invention, mushroom shaped tips are used, but other geometries are possible, and known to those skilled in the art. The complete fabrication process for the p(DMA-co-MEA)-coated array of fibers with mushroom-shaped tips is illustrated in FIG. 6E.

In one embodiment, the first step in the creation of the array of fibers involves dipping an array of cylindrical polyurethane (ST-1087, BJB Enterprises) pillars of approximately 40 μm in diameter and 100 μm in height into a thin layer of uncured polyurethane precursor spun onto a polystyrene plate (as shown in FIG. 6A), retracting the array such that small droplets of uncured polyurethane are present on the tip of each fiber (as shown in FIG. 2b), and placed onto a clean surface and allowed to cure (FIG. 6C). After the mushroom tips have cured, the array is peeled from the clean surface. A relatively stiffer polyurethane (Modulus of Elasticity (E) range between about 6 and about 60 MPa, with one embodiment having E=9.8 MPa) was used as the fiber material because the stiffer material reduced the number of fibers that collapsed and stuck together during the material fabrication, particularly after the peeling processes which occur after steps (c) and (f) in FIGS. 6C and 6F, respectively. Attractive qualities of this polyurethane also include its high toughness and strain before fracture. In other embodiments of the invention, the microfibers may have a diameter ranging from about 0.2 nm to about 1 mm and a height ranging from about 1 nm to about 1 mm.

Other embodiments may involve any other geometry which demonstrates crack trapping to enhance adhesion, including but not limited to fibers with spatula-shaped tips, film-terminated fiber arrays, angled fibers, fibers with angled tips, or porous or cleaved geometries which demonstrate crack-trapping for enhanced adhesion. These geometries would be fabricated through microfabrication methods including, but not limited to, photolithography, interference lithography, micromolding, deep reactive ion etching, hot embossing, fiber drawing, and directed self assembly.

Coating Shaped Tips with Adhesive Polymer—In the present invention, the fiber tips which have been fabricated according to a method as listed above, or by other methods that are known to those skilled in the art, are dipped into a thin liquid layer of a polymer precursor. In one embodiment of the present invention, this is a prepared unpolymerized p(DMA-co-MEA) precursor solution which has been spun onto a clean glass plate (as shown in FIG. 6D). The array is retracted from the plate, such that a small droplet of unpolymerized p(DMA-co-MEA) precursor solution is present on each tip and allowed to rest in air (FIG. 6E) to allow for some solvent evaporation. The coated, fiber array is then stamped onto a clean, transparent surface and exposed with ultraviolet light (in one embodiment, at 365 nm, UVGL-25, UVP LLC for thirty minutes) to initiate polymerization of the tip coating (FIG. 6F). Finally, the array is peeled from the surface, resulting in the final patterned, coated material (as shown in FIG. 6G). The resulting catecholic functional group-containing p(DMA-co-MEA) tip coatings using this process are extremely thin (one embodiment being less than 1 μm thick, another embodiment being up to 10 μm thick), which is advantageous because thinner coatings are subjected to reduced stress and relaxation, which is more efficient at transferring stress to the substrate which results in enhanced adhesion equal to or greater than 10 mN (See FIG. 8).

FIGS. 7A-E are microscopy images of fabricated patterned, p(DMA-co-MEA)-coated arrays of fibers with mushroom tips. FIG. 7A is a top view optical microscopy image of array of fibers with mushroom-shaped tips and thin p(DMA-co-MEA) tip coating; FIG. 7B is a SEM image of FIG. 7A; FIG. 7C is a backscattered top view SEM image of p(DMA-co-MEA)-coated fibers with mushroom tips. Here, gold nanoparticles (bright pixels) were mixed with the tip material before the dip-coating process to visualize whether material was successfully transferred to the fibers. FIGS. 7A and 7B show optical microscopy and scanning electron microscope (SEM) images of a p(DMA-co-MEA)-coated array of polyurethane fibers with mushroom tips fabricated using this protocol. Because it is difficult to visualize the thin p(DMA-co-MEA) coating with either SEM or optical microscopy, separate specimens were prepared which included 5 nm diameter gold particles suspended in the p(DMA-co-MEA) solution before the step illustrated in FIG. 6D. During the dipping process, many of these particles were transferred to the fibers, allowing for visualization of the presence of p(DMA-co-MEA) on the mushroom tips. FIG. 7C shows the top view of a backscattered SEM image of approximately 1200 fibers with gold nanoparticles embedded in the p(DMA-co-MEA) tip coating. Unlike the image illustrated in FIG. 7B, this sample was not sputtered with a metallic coating before imaging, which lets the viewer distinguish the gold nanoparticles from the rest of the polymeric structure. The presence of gold, and thus the p(DMA-co-MEA) coating layer, is apparent by the white pixels in the image. The distribution of brightness is fairly consistent over all 1200 fibers, but the degree of brightness is somewhat less regular, as evidenced by the higher magnification images shown in FIGS. 7D and 7E. This is because the gold nanoparticles were not homogeneously soluble in the p(DMA-co-MEA) solution, so there were areas of particle concentration on the fiber tips after the microprinting coating process. FIGS. 7D and 7E are close-ups of FIG. 7C. Scale bar=200 mm in FIGS. 7A and 7B; Scale bar=2 mm in FIG. 7C; Scale bar=400 mm in FIG. 7D; Scale bar=100 mm in FIG. 7E.

Testing/Results—Before testing, five control samples were also fabricated to compare the adhesion results of our p(DMA-co-MEA)-coated mushroom tipped microfibers with both coated and uncoated materials with various geometries. These control materials consisted of: Sample #1) Flat uncoated polyurethane samples; Sample #2) Flat, polyurethane samples coated with photopolymerized p(DMA-co-MEA; Sample #3) Uncoated mushroom-tipped microfiber arrays with identical geometry to the coated arrays described above per the process of the present invention; Sample #5) Uncoated film-terminated microfibrillar arrays; and Sample #6) Film-terminated microfibrillar arrays coated with p(DMA-co-MEA). Sample #4 is manufactured per the process of the present invention.

All samples were subjected to indentation adhesion testing of p(DMA-co-MEA)-coated polyurethane fibers with mushroom tips in contact with a 6 mm diameter glass hemisphere for increasing preloads. A glass hemisphere was used as the contacting surface because it represents a non-flat surface and eliminates alignment problems during testing. Adhesion results for this material in contact with a glass hemisphere in fully submerged conditions for increasing preloads are shown in FIG. 8.

Figure 8:
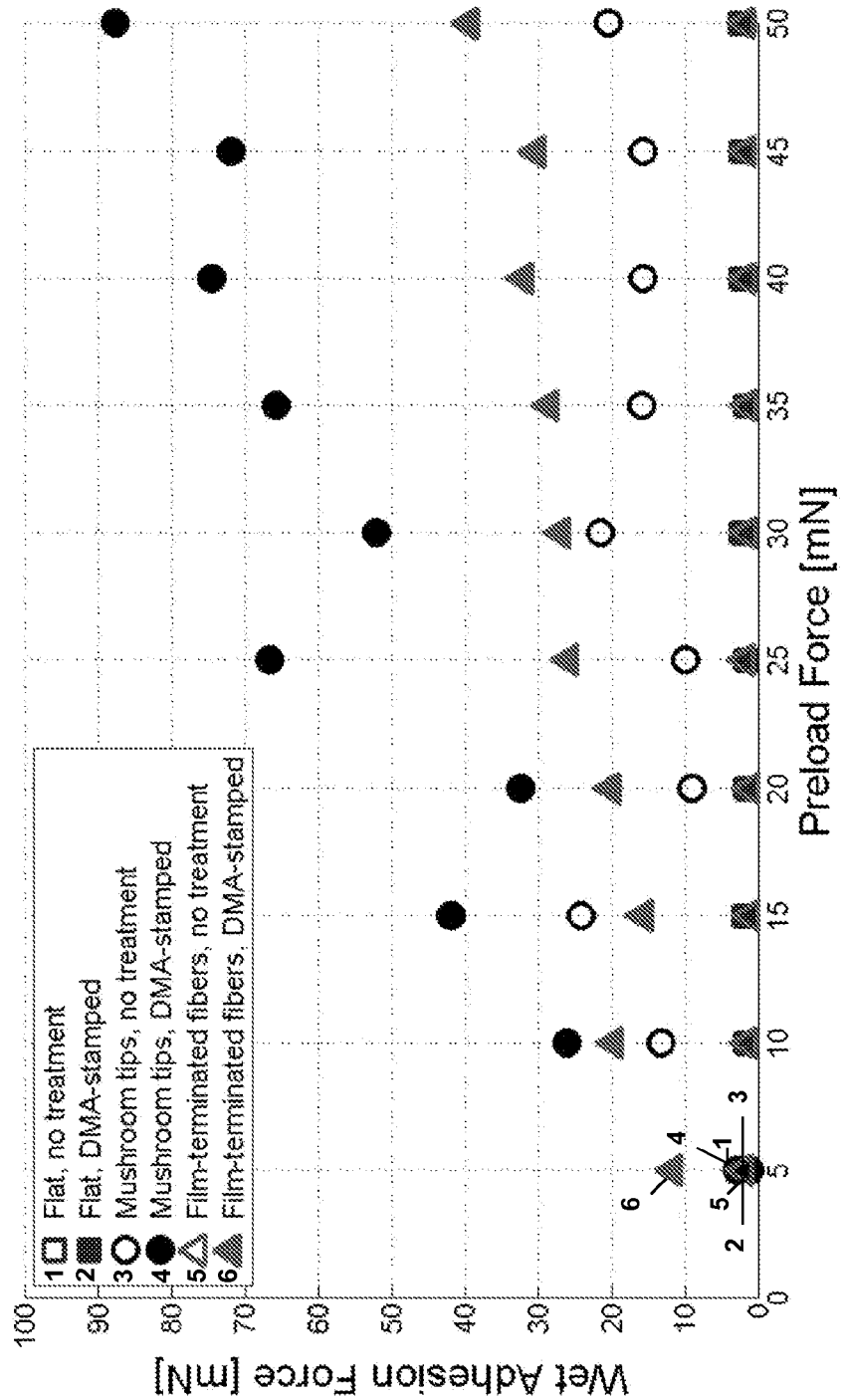
FIG. 8 is a data plot of the experimentally determined wet adhesion of uncoated fibrillar and p(DMA-co-MEA)-stamped materials with a 6 mm glass hemisphere for increasing preloads.

FIG. 8 is a data plot of the experimentally determined wet adhesion of uncoated fibrillar and p(DMA-co-MEA)-stamped materials with a 6 mm glass hemisphere for increasing preloads. The p(DMA-co-MEA)-coated fibers with mushroom tips (Sample #4) demonstrate increased adhesion enhancement over the other samples #1, #2, #3, #5, and #6 at preload forces equal to or greater than 10 mN up to 50 mN demonstrating a wet adhesion force ranging from about 25 mN to about 90 mN, respectively.

The wet adhesion results illustrate a clear enhancement for the p(DMA-co-MEA) coated fibers with mushroom tips over the other engineered materials. Over the preload range of 10 mN to 50 mN, an average 32-times adhesion enhancement over flat, uncoated polyurethane is observed for some samples. The presence of p(DMA-co-MEA) on the surface of each tip further increases the maximum pull-off force during testing resulting in cumulative enhancements of both micro-patterning and coating.

Figure 9:
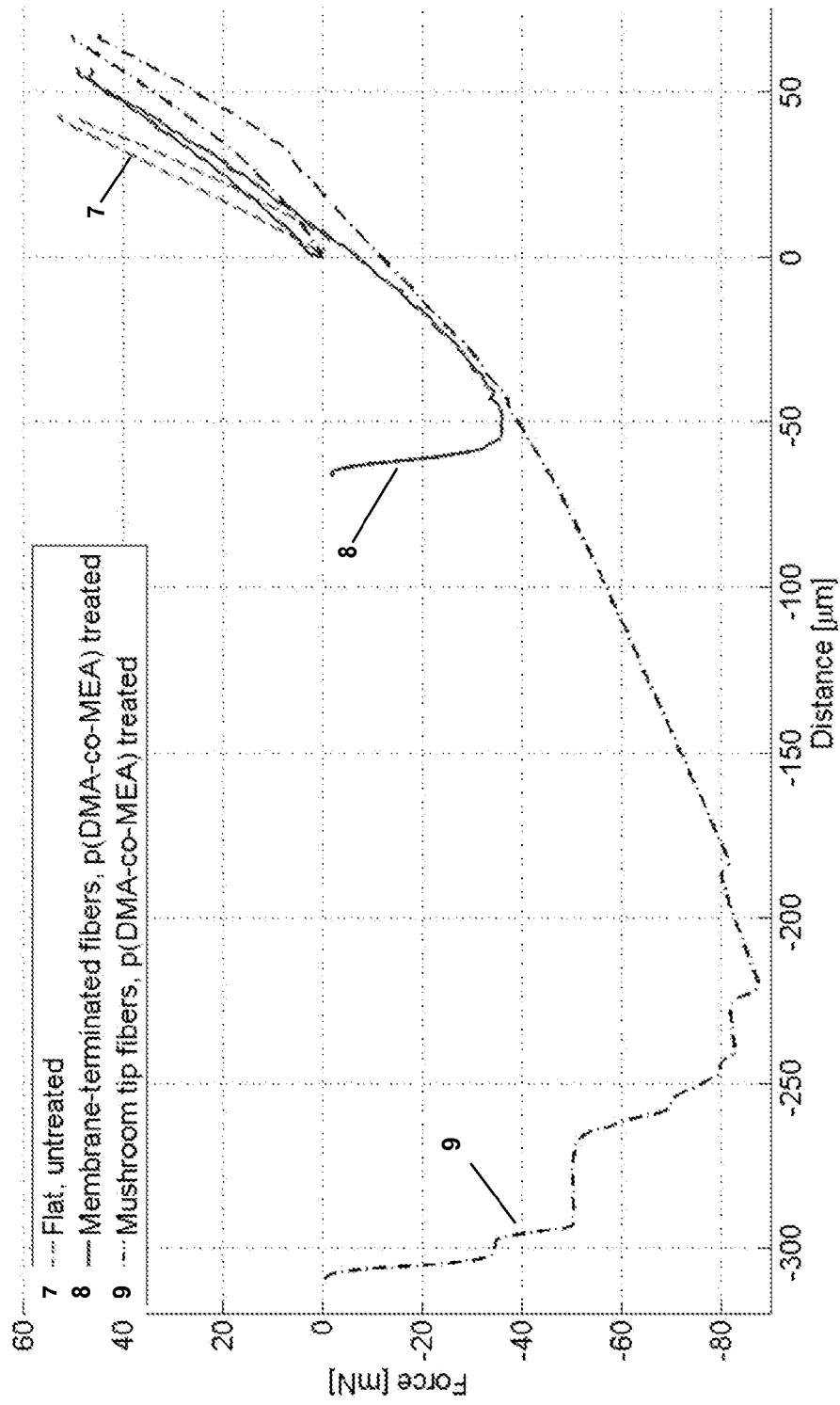
FIG. 9 is a data plot of Force-distance data at 50 mN preload for flat untreated, p(DMA-co-MEA) treated film terminated samples, and p(DMA-co-MEA) treated fibers with mushroom tips in submerged conditions during adhesion testing with a glass hemisphere.

FIG. 9 shows the resulting force-distance curve for Sample #8, a p(DMA-co-MEA)-coated array of micro-fibers with mushroom tips fabricated according to the present invention at 50 mN preload and compares it to the force-distance curves from flat, uncoated polyurethane specimen, Sample #7, and for the membrane-terminated fiber p(DMA-co-MEA)-coated array, Sample #9. By comparing the adhesion hysteresis, the integrated area between the approach and retract curves during a single test cycle, it is clear that the effective interface toughness for coated, mushroom-tipped materials is significantly enhanced with respect to both flat, unpatterned materials and the membrane-terminated fiber p(DMA-co-MEA)-coated array structures.

These results demonstrate a significant adhesion enhancement for the p(DMA-co-MEA) coated mushroom-tipped fibers in contact with a glass hemisphere when compared to unpatterned or uncoated materials as well as the membrane-terminated fiber p(DMA-co-MEA)-coated array structures. Scaled up version of mushroom-shaped fibers clearly illustrated the improved ability of mushroom-tipped structures to resist crack propagation during fiber pull off and attributed this performance to thin lip around the perimeter of the fibers, and also clearly demonstrated that fiber pull-off originates at the center of the fiber, and radiates outward, resulting in the formation of a cavity at the fiber tip. This cavity formation can result in a pressure difference with respect to the testing environment, which means that suction forces can also contribute to the adhesion of mushroom-tipped fibers. Indeed, this appears to be the case with our uncoated mushroom-tipped structures, which still demonstrate considerable adhesive ability underwater where plain cylindrical fibers and uncoated polyurethanes do not.

The patterned, coated materials developed and evaluated as described in the present invention demonstrate a clear wet adhesion performance enhancement over uncoated and unpatterned materials, either coated or identically patterned uncoated materials, and coated and patterned materials. These measured performance enhancements demonstrate the enhancement of adhesion of this hybrid patterning and coating approach to adhesive material design for real-world applications. The multi-step fabrication protocol can also be adapted for different fiber materials or tip coatings to optimize the functionality of the material for a targeted substrate or application.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method to make micro-fiber arrays with tip coating having enhanced adhesion properties in wet and dry environments, the method comprising the steps of:
    preparing an optimized p(DMA-co-MEA) precursor solution for a tip coating material;
    preparing structural micropatterned arrays of fibers with geometric tips;
    applying uniformly a volume of the tip coating material onto an uncoated surface to form a uniform tip coating layer on a coated surface;
    bringing the geometric tips of the structural micropatterned arrays of fibers in contact with the uniform tip coating layer of the coated surface;
    retracting the geometric tips of the structural micropatterned arrays of fibers from the uniform tip coating layer to form small droplets of uncured optimized p(DMA-co-MEA) precursor solution on a geometric tip of each fiber of the structural micropatterned arrays of fibers;
    placing the geometric tip of the each fiber of the structural micropatterned arrays of fibers onto a clean surface;
    curing the small droplets of uncured optimized p(DMA-co-MEA) precursor solution on the geometric tip of the each fiber of the structural micropatterned arrays of fibers to form cured geometric tips; and
    peeling the geometric tip of the each fiber of the structural micropatterned arrays of fibers from the clean surface after the geometric tips have cured.

2. The method according to claim 1, wherein the step of curing comprises the step of photopolymerizing.

3. The method according to claim 1, wherein the structural micropatterned arrays of fibers is made of a polyurethane having a Modulus of Elasticity (E) ranging from about 6 to about 60 MPa to reduce the number of fibers of the structural micropatterned arrays of fibers that collapse and stick together during material fabrication.

4. The method according to claim 1, wherein the structural micropatterned arrays of fibers is made of a polyurethane having a Modulus of Elasticity (E) of about 9.8 MPa.

5. The method according to claim 1, wherein the optimized p(DMA-co-MEA) precursor solution for the tip coating material comprises mucoadhesive materials.

6. The method according to claim 1, wherein the optimized p(DMA-co-MEA) precursor solution for the tip coating material comprises magnetic micro and/or nano particles.

7. The method according to claim 1, wherein the cured geometric tip of the each fiber of the structural micropatterned arrays of fibers has a hardness between about Shore A 1 and about Shore A 90.

8. The method according to claim 1, wherein the cured geometric tip of the each fiber of the structural micropatterned arrays of fibers has a layer of tip coating material less than 1 µm in thickness.

9. The method according to claim 1, wherein the cured geometric tip of the each fiber of the structural micropatterned arrays of fibers has a layer of tip coating material up to 10 µm in thickness.

10. The method according to claim 1, wherein the step of applying uniformly a volume of the tip coating material onto the uncoated surface is by Spin Coating.

11. The method according to claim 1, wherein the step of applying uniformly a volume of the tip coating material onto the uncoated surface is by Knife Coating.

12. The method according to claim 1, wherein the step of applying uniformly a volume of the tip coating material onto the uncoated surface is by deposition spray.

13. The method according to claim 1, wherein the step of applying uniformly a volume of the tip coating material onto the uncoated surface is selected from the group consisting of gravure coating, reverse roll coating, slot die (extrusion) coating, immersion (dip) coating, curtain coating, and air knife coating.

14. The method according to claim 2, wherein the step of photopolymerizing comprises the step of exposing the structural micropatterned arrays of fibers with ultraviolet light to initiate polymerization of the tip coating material.

15. The method according to claim 1, wherein the step of curing comprises the step of exposing the tip coating material to heat, wherein the tip coating material comprises a thermoset.

16. The method according to claim 1, wherein the step of curing comprises the step of evaporating solvent of the tip coating material.

17. The method according to claim 1, wherein the step of preparing the array of structural micropatterned arrays of fibers is selected from the group consisting of photolithography, interference lithography, micromolding, deep reactive ion etching, hot embossing, fiber drawing, and directed self assembly.

18. The method according to claim 1, wherein the geometric tips are unmodified.

19. The method according to claim 1, wherein the geometric tips are modified.

20. The method according to claim 1, wherein the structural micropatterned arrays of fibers are selected from a group consisting of fibers with mushroom shaped tips, cylindrical fibers, fibers with spatula-shaped tips, film-terminated fiber arrays, angled fibers, fibers with angled tips, porous or cleaved geometries which demonstrate crack-trapping for enhanced adhesion, and crack trapping geometry that demonstrates enhanced adhesion.

21. The method according to claim 1, wherein the each fiber of the structural micropatterned arrays of fibers comprises a diameter ranging from about 0.2 nm to about 1 mm and a height ranging from about 1 nm to about 1 mm.

* * * * *